United States Patent
Herman et al.

(10) Patent No.: US 11,807,256 B2
(45) Date of Patent: Nov. 7, 2023

(54) DYNAMIC CALIBRATION OF VEHICLE SENSORS

(71) Applicant: Ford Global Technologies, LLC, Dearborn, MI (US)

(72) Inventors: David Michael Herman, West Bloomfield, MI (US); Aaron Lesky, Ypsilanti, MI (US); Catherine Marie Amodeo, Livonia, MI (US); Alexander George Shanku, Grosse Pointe Park, MI (US); Venkatesh Krishnan, Canton, MI (US); Keith Van Gorder, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 17/590,100

(22) Filed: Feb. 1, 2022

(65) Prior Publication Data

US 2023/0242133 A1 Aug. 3, 2023

(51) Int. Cl.
*B60W 50/06* (2006.01)
*G01S 7/497* (2006.01)
*G01S 7/40* (2006.01)
*G05B 13/02* (2006.01)
*B60W 50/02* (2012.01)

(52) U.S. Cl.
CPC ........ *B60W 50/06* (2013.01); *B60W 50/0205* (2013.01); *G01S 7/40* (2013.01); *G01S 7/497* (2013.01); *G05B 13/027* (2013.01); *B60W 2420/40* (2013.01); *B60W 2420/52* (2013.01)

(58) Field of Classification Search
CPC ............ B60W 50/06; B60W 50/0205; B60W 2420/40; B60W 2420/52; G01S 7/40; G01S 7/497; G05B 13/027
See application file for complete search history.

(56) References Cited

U.S. PATENT DOCUMENTS

| | | | |
|---|---|---|---|
| 10,521,977 B2 | 12/2019 | Pitt et al. | |
| 2021/0134079 A1 | 5/2021 | Nee | |
| 2023/0066919 A1* | 3/2023 | Navin | G01C 25/005 |
| 2023/0083888 A1* | 3/2023 | Zavesky | H04L 67/12 |
| | | | 700/110 |

FOREIGN PATENT DOCUMENTS

| | | |
|---|---|---|
| CN | 112378437 A | 2/2021 |
| DE | 102018216104 A1 | 3/2020 |
| EP | 3771922 A1 | 2/2021 |

* cited by examiner

*Primary Examiner* — Alan D Hutchinson
(74) *Attorney, Agent, or Firm* — Frank A. MacKenzie; Bejin Bieneman PLC

(57) ABSTRACT

A computer includes a processor and a memory storing instructions executable by the processor to receive a first time series of positions of a vehicle sensor mounted on a vehicle from at least one calibration sensor spaced from the vehicle, measured while vibrations are applied to the vehicle; receive a second time series of motion of the vehicle sensor based on data from the vehicle sensor measured while the vibrations are applied to the vehicle; fuse the first and second time series; and determine at least one calibration value for an adjustment model based on the fusion of the first and second time series. The adjustment model is a model of motion of the vehicle sensor relative to the vehicle resulting from motion of the vehicle.

20 Claims, 4 Drawing Sheets

DYNAMIC CALIBRATION OF VEHICLE SENSORS

BACKGROUND

Autonomous or semi-autonomous vehicles typically include optical sensors. The optical sensors detect the external world, e.g., objects and/or characteristics of surroundings of the vehicle, such as other vehicles, road lane markings, traffic lights and/or signs, pedestrians, etc. For example, the optical sensors can include radar sensors, scanning laser range finders, light detection and ranging (LIDAR) devices, and image processing sensors such as cameras. For autonomous and semi-autonomous vehicles, a computer can be programmed to operate the vehicle independently of the intervention of a human operator, completely or to a lesser degree, based on inputs that can include data received from the optical sensors.

DETAILED DESCRIPTION

Figure 1:
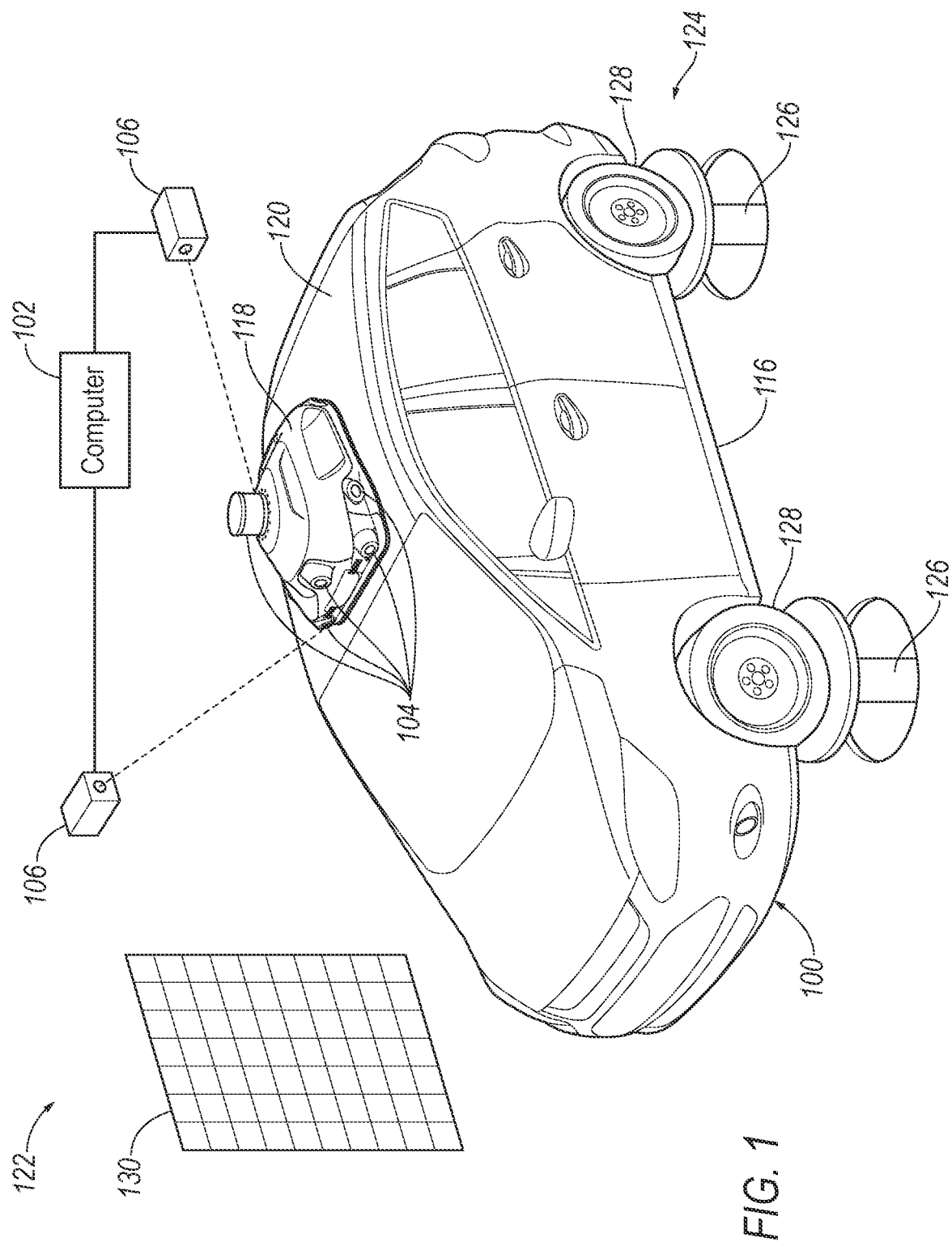
FIG. 1 is a perspective view of an example vehicle in an example calibration environment.

Some sensors on a vehicle generate optical data that a computer of the vehicle can use for operating the vehicle. For the optical data to be usable by the computer, the vehicle sensors may need to have tight tolerances for motion relative to a body of the vehicle, e.g., for how much the vehicle sensor of interest can twist, tilt, bounce, etc. compared to the body or to other vehicle sensors mounted on the body. One way to address the tight tolerance is to use a mounting structure for the vehicle sensors that has a high stiffness. Limiting the sensor motion can be achieved with higher stiffness materials, e.g., carbon fiber composites, with thicker components, active alignment, or with added components for reinforcement, any of which can add complexity and/or weight. Also, a higher stiffness can increase shocks transmitted from the body to the vehicle sensor. With increasing sensor resolution, the ability to limit sensor relative motion may not be achievable with existing methods based on perception algorithm requirements.

Techniques are provided herein that address the tolerances for the vehicle sensor in addition to or in lieu of increasing stiffness. A computer can calibrate the vehicle sensor by receiving a first time series of positions of the vehicle sensor from a calibration sensor spaced from the vehicle that are measured while vibrations are applied to the vehicle, receiving a second time series of motion of the vehicle sensor based on data from the vehicle sensor measured while the vibrations are applied to the vehicle, fusing the first and second time series, and determining calibration values for an adjustment model based on the fusion of the first and second time series. The adjustment model is a model of motion of the vehicle sensor relative to the vehicle resulting from motion of the vehicle. This dynamic calibration enables a vehicle computer on board the vehicle to adjust the data received from the vehicle sensor based on motion of the vehicle, increasing the accuracy of that data.

A computer includes a processor and a memory, and the memory stores instructions executable by the processor to receive a first time series of positions of a vehicle sensor mounted on a vehicle from at least one calibration sensor spaced from the vehicle, measured while vibrations are applied to the vehicle; receive a second time series of motion of the vehicle sensor based on data from the vehicle sensor measured while the vibrations are applied to the vehicle; fuse the first and second time series; and determine at least one calibration value for an adjustment model based on the fusion of the first and second time series. The adjustment model is a model of motion of the vehicle sensor relative to the vehicle resulting from motion of the vehicle.

The first time series may include an orientation of the vehicle sensor based on a location of a beam emitted by the vehicle sensor.

The instructions may further include instructions to instruct a dynamic exciter to apply the vibrations to the vehicle. The vibrations may follow a preset sequence. The preset sequence may include a repeating pattern.

The preset sequence may include a previously measured sequence of road vibrations.

The instructions may further include instructions to output the at least one calibration value.

The instructions may further include instructions to perform a static calibration of the vehicle sensor based on data from the vehicle sensor measured while the vibrations are not being applied to the vehicle.

Fusing the first and second time series may include executing a machine-learning algorithm.

The adjustment model may include at least one equation, and the at least one calibration value may include at least one coefficient for the at least one equation.

The adjustment model may include a machine-learning algorithm, and the at least one calibration value may include at least one weight of the machine-learning algorithm. The machine-learning algorithm may be a neural network including a plurality of layers including a terminal layer, and the terminal layer may include the at least one weight.

A method includes applying vibrations to a vehicle; while applying the vibrations to the vehicle, measuring a first time series of positions of a vehicle sensor mounted on the vehicle by at least one calibration sensor spaced from the vehicle; determining a second time series of motion of the vehicle sensor based on data from the vehicle sensor measured while applying vibrations to the vehicle; fusing the first and second time series; determining at least one calibration value for an adjustment model based on the fusion of the first and second time series, the adjustment model being a model of motion of the vehicle sensor relative to the vehicle resulting from motion of the vehicle; and loading the adjustment model onto a vehicle computer of the vehicle.

The method may further include providing the vehicle on a dynamic exciter, and applying the vibrations may include instructing the dynamic exciter to apply the vibrations. Applying the vibrations may include instructing the dynamic exciter to apply the vibrations independently to each wheel of the vehicle.

The method may further include providing a calibration target in a field of view of the vehicle sensor, and determining the second time series may be based on positions of the calibration target in the data from the vehicle sensor. The calibration target may be fixed while the vibrations are applied to the vehicle.

The vehicle sensor may be one of a camera, a radar, or a LIDAR.

The method may further include operating the vehicle based on data from the vehicle sensor adjusted by the adjustment model.

The vehicle computer may be programmed to output a message requesting to determine the at least one calibration value for the adjustment model in response to a criterion being satisfied.

the instructions further include instructions to output the at least one calibration value.

With reference to the Figures, wherein like numerals indicate like parts throughout the several views, a computer 102 includes a processor and a memory storing instructions executable by the processor to receive a first time series of positions of a vehicle sensor 104 mounted on a vehicle 100 from at least one calibration sensor 106 spaced from the vehicle 100, measured while vibrations are applied to the vehicle 100; receive a second time series of motion of the vehicle sensor 104 based on data from the vehicle sensor 104 measured while the vibrations are applied to the vehicle 100; fuse the first and second time series; and determine at least one calibration value for an adjustment model based on the fusion of the first and second time series. The adjustment model is a model of motion of the vehicle sensor 104 relative to the vehicle 100 resulting from motion of the vehicle 100. The vehicle sensor 104 of interest can be one of a plurality of vehicle sensor 104 of the vehicle 100.

With reference to FIG. 1, the vehicle 100 may be any suitable type of ground vehicle, e.g., a passenger or commercial automobile such as a sedan, a coupe, a truck, a sport utility, a crossover, a van, a minivan, a jeepney, a taxi, a bus, etc. Alternatively, the vehicle 100 can be a non-automobile such as an autonomous material-handling machine, a lawn mower, a robot floor cleaner, etc.

The vehicle 100 may be an autonomous vehicle. A vehicle computer 108 (shown in FIG. 2) can be programmed to operate the vehicle 100 independently of the intervention of a human operator, completely or to a lesser degree. The vehicle computer 108 may be programmed to operate a propulsion 110, a brake system 112, a steering system 114, and/or other vehicle systems based at least in part on data from the vehicle sensors 104 (shown in FIG. 2). For the purposes of this disclosure, autonomous operation means the vehicle computer 108 controls the propulsion 110, brake system 112, and steering system 114 without input from a human operator; semi-autonomous operation means the vehicle computer 108 controls one or two of the propulsion 110, brake system 112, and steering system 114 and a human operator controls the remainder; and nonautonomous operation means a human operator controls the propulsion 110, brake system 112, and steering system 114.

The vehicle 100 includes a body 116. The vehicle 100 may be of a unibody construction, in which a frame and the body 116 of the vehicle 100 are a single component. The vehicle 100 may, alternatively, be of a body-on-frame construction, in which the frame supports the body 116 that is a separate component from the frame. The frame and the body 116 may be formed of any suitable material, for example, steel, aluminum, etc.

The vehicle 100 includes at least vehicle sensor 104, e.g., a plurality of vehicle sensors 104. The vehicle sensors 104 can be optical sensors. Optical sensors generate optical data from receiving electromagnetic radiation, e.g., radio waves, infrared radiation, visible light, etc. The vehicle sensors 104 may incorporate active illumination, e.g. radar and lidar, that both transmit and receive electromagnetic radiation. The vehicle sensors 104 can be any suitable types of optical sensors for detecting objects spaced from the vehicle 100, e.g., radar sensors, scanning laser range finders, light detection and ranging (LIDAR) devices, and/or image processing sensors such as cameras. For example, the vehicle sensors 104 can include cameras such as charge-coupled devices (CCD), complementary metal oxide semiconductors (CMOS), etc. For another example, the vehicle sensors 104 can include a pair of stereo cameras including a first camera and a second camera. For another example, the vehicle sensors 104 can include a LIDAR, which detects distances to objects by emitting laser pulses at a particular wavelength and measuring the time of flight for the pulse to travel to the object and back. For another example, the vehicle sensors 104 can include a radar, which can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. A radar can return distances to object as well as radial velocity, i.e., the component of velocity toward or away from the radar. The vehicle sensors 104 could also include cameras for different wavelengths of electromagnetic radiation, cameras that detect polarization, time-of-flight cameras, event-based cameras, light-field cameras, etc.

The vehicle sensors 104 can produce data, e.g., optical data from optical sensors. Optical data can be image data from a camera, radar data, LIDAR data, etc. For example, image data can be a sequence of image frames of the fields of view of the respective sensors. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the field of view. For another example, radar data and LIDAR data (after preprocessing) can be point clouds, e.g., represented as a set of directions and respective distances from the vehicle sensor 104 or as a set of three-dimensional vectors in a coordinate frame fixed relative to the vehicle sensor 104, or can be depth images, etc. For another example, an event-based camera would generate an event stream of pixel intensity changes.

The vehicle sensors 104 are rigidly mounted to the body 116 of the vehicle 100. For example, the vehicle 100 can include a housing 118 mounted on a roof 120 or other body panel of the body 116 of the vehicle 100 and supporting the vehicle sensors 104. The housing 118 may be shaped to be attachable to the roof 120, e.g., may have a shape matching a contour of the roof 120. The housing 118 may be attached to the roof 120, which can provide the vehicle sensors 104 mounted inside the housing 118 with an unobstructed field of view of an area around the vehicle 100. The housing 118 may be formed of, e.g., plastic or metal. Alternatively or additionally, the vehicle sensors 104 can be mounted to the windshield, front fascia, corner fascia, rear fascia, rear liftgate, etc.

For performing the calibrations described herein, the vehicle 100 can be positioned in a calibration environment 122. The calibration environment 122 is a facility with equipment for performing calibrations of the vehicle sensors 104. The calibration environment 122 can be a dedicated facility or can be a multipurpose facility into which calibration equipment has been temporarily placed. For example, the calibration environment 122 can be in an end-of-line production and assembly plant or an autonomous-vehicle depot used to service and repair vehicles.

The calibration environment 122 can include a dynamic exciter 124. The dynamic exciter 124 can include actuators 126, e.g., hydraulic actuators, for pressing against components of the vehicle 100. The dynamic exciter 124 can be any suitable type for simulating road vibrations, e.g., a hydraulic or electrodynamic 4-poster, a 7-post shaker, a chassis dynamometer, etc. A 4-poster includes four actuators 126 positioned beneath respective wheels 128 of the vehicle 100 and oriented to actuate vertically, as shown in FIG. 1. A 7-post shaker includes the four actuators 126 of the 4-poster as well as three additional actuators 126 positioned to press against the body 116 of the vehicle 100 to simulate lateral load transfer, longitudinal weight transfer, etc. A chassis dynamometer, or "rolling road," includes fixed roller assemblies on which the wheels 128 are placed, and the roller assemblies can be rotated to impart rotation to the wheels 128. Surface roughness or texture on the rollers of the roller assemblies can be used for applying the vibrations.

The calibration environment 122 can include the calibration sensors 106. The calibration sensors 106 can include position sensors trained on respective vehicle sensors 104 or on prespecified points of the vehicle 100. The calibration sensors 106 can output data indicating three-dimensional positions of the vehicle sensors 104 relative to the calibration environment 122 and/or velocity of the vehicle sensors 106 relative to the calibration environment, e.g., represented as a three-dimensional vector. For example, the calibration sensors 106 can include multiple, e.g., three, calibration sensors 106 trained on a vehicle sensor 104 of interest that each output a distance to the vehicle sensor 104, permitting a determination of the position of the vehicle sensor 104 by triangulation based on known positions of the calibration sensors 106. Additionally, the calibration sensors 106 can include optical sensors or other types of sensors suitable for detecting beams emitted by the vehicle sensors 104, e.g., if the vehicle sensors 104 are radar or LIDAR sensors. For example, the calibration environment 122 can include a surface at which the beam of one of the vehicle sensors 104 is directed, and the calibration sensor 106 can detect a point on the surface at which the beam intersects the surface, or the surface can include corner cube reflectors, retroreflectors, etc. that the calibration sensor 106 can detect when the beam intersects them. The calibration sensors 106 can produce time series data of the positions of the vehicle sensors 104 or beams over time as those positions change.

The calibration environment 122 can include one or more calibration targets 130. The calibration targets 130 can be placed in respective fields of view of the vehicle sensors 104. Each calibration target 130 can be any suitable shape and appearance permitting one of the vehicle sensors 104 to detect a position of a point on the calibration target 130 relative to the sensor. For example, as shown in FIG. 1, the calibration target 130 can include a checkerboard pattern. The checkerboard pattern can provide points that the vehicle sensors 104 can detect when performing static or dynamic calibration, as will be described below.

The calibration environment 122 can include the computer 102. The computer 102 is a microprocessor-based computing device, e.g., a generic computing device including a processor and a memory. The memory of the computer 102 can include media for storing instructions executable by the processor as well as for electronically storing data and/or databases, and/or the computer 102 can include structures such as the foregoing by which programming is provided. The computer 102 can be multiple computers coupled together.

Figure 2:
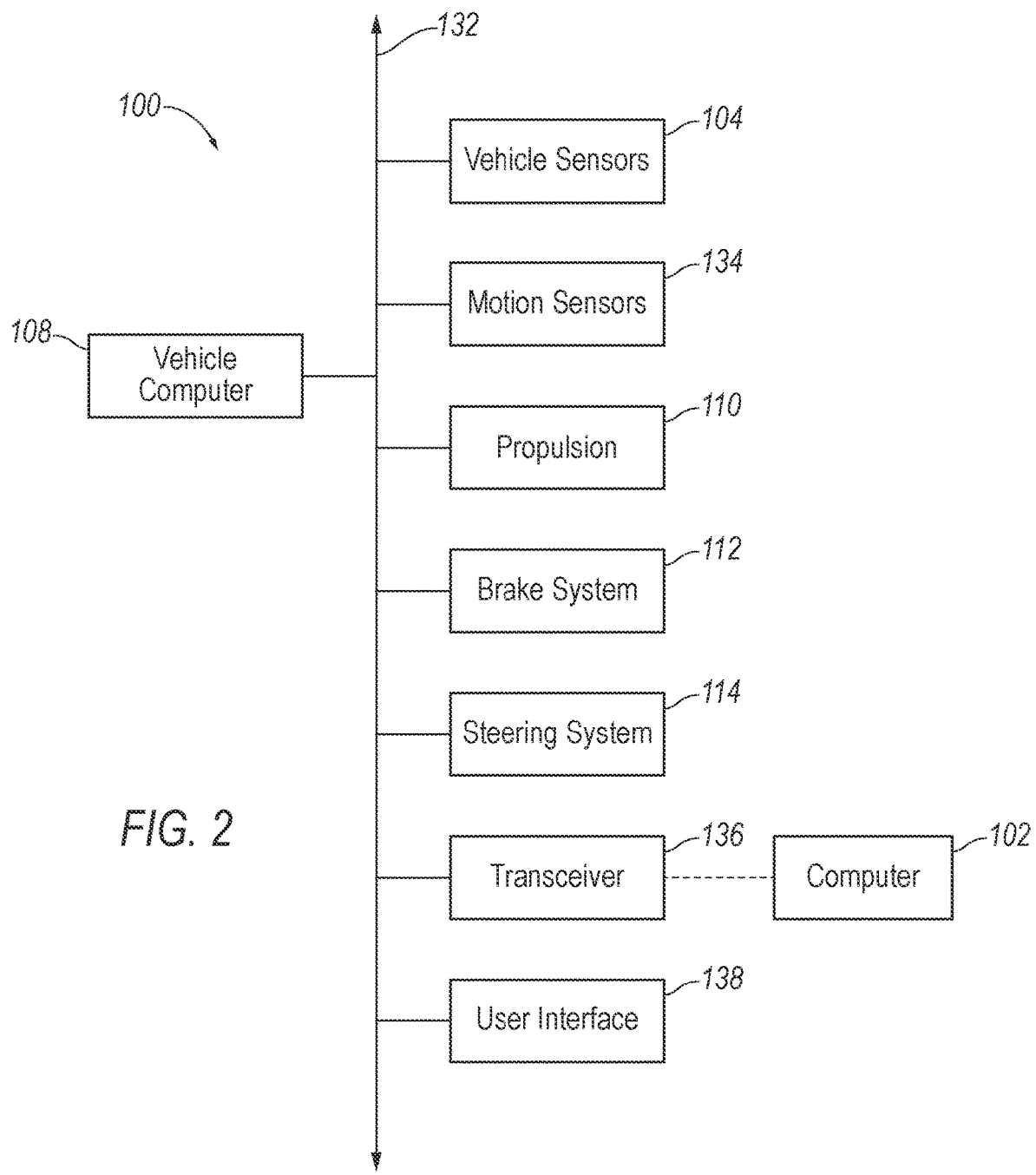
FIG. 2 is a block diagram of the vehicle.

With reference to FIG. 2, the vehicle 100 can include the vehicle computer 108. The vehicle computer 108 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 108 can thus include a processor, a memory, etc. The memory of the vehicle computer 108 can include media for storing instructions executable by the processor as well as for electronically storing data and/or databases, and/or the vehicle computer 108 can include structures such as the foregoing by which programming is provided. The vehicle computer 108 can be multiple computers coupled together.

The vehicle computer 108 may transmit and receive data with other components on board the vehicle 100 through a communications network 132 such as a controller area network (CAN) bus, Ethernet, WiFi, Local Interconnect Network (LIN), onboard diagnostics connector (OBD-II), and/or by any other wired or wireless communications network. The vehicle computer 108 may be communicatively coupled to the vehicle sensors 104, motion sensors 134, the propulsion 110, the brake system 112, the steering system 114, a transceiver 136, a user interface 138, and other components via the communications network 132.

The motion sensors 134 provide motion data, i.e., data indicating motion of the vehicle 100. For example, the motion sensors 134 may detect the location and/or orientation of the vehicle 100, linear and rotational velocity of the vehicle 100, acceleration of the vehicle 100, etc. For example, the motion sensors 134 may include global positioning system (GPS) sensors; accelerometers such as piezoelectric or microelectromechanical systems (MEMS); gyroscopes such as rate, ring laser, or fiber-optic gyroscopes; inertial measurements units (IMU); and magnetometers. For another example, the motion sensors 134 may provide data about operation of systems of the vehicle 100 controlling the motion, i.e., the propulsion 110, the brake system 112, and/or the steering system 114, e.g., wheel speed, wheel travel, wheel orientation, steering angle, braking force, etc.

The propulsion 110 of the vehicle 100 generates energy and translates the energy into motion of the vehicle 100. The propulsion 110 may be a conventional vehicle propulsion subsystem, for example, a conventional powertrain including an internal-combustion engine coupled to a transmission that transfers rotational motion to the wheels 128; an electric powertrain including batteries, an electric motor, and a transmission that transfers rotational motion to the wheels 128; a hybrid powertrain including elements of the conventional powertrain and the electric powertrain; or any other type of propulsion. The propulsion 110 can include an electronic control unit (ECU) or the like that is in communication with and receives input from the vehicle computer 108 and/or a human operator. The human operator may control the propulsion 110 via, e.g., an accelerator pedal and/or a gear-shift lever.

The brake system 112 is typically a conventional vehicle braking subsystem and resists the motion of the vehicle 100 to thereby slow and/or stop the vehicle 100. The brake system 112 may include friction brakes such as disc brakes, drum brakes, band brakes, etc.; regenerative brakes; any other suitable type of brakes; or a combination. The brake system 112 can include an electronic control unit (ECU) or the like that is in communication with and receives input from the vehicle computer 108 and/or a human operator. The human operator may control the brake system 112 via, e.g., a brake pedal.

The steering system 114 is typically a conventional vehicle steering subsystem and controls the turning of the wheels 128. The steering system 114 may be a rack-and-pinion system with electric power-assisted steering, a steer-by-wire system, as both are known, or any other suitable system. The steering system 114 can include an electronic control unit (ECU) or the like that is in communication with and receives input from the vehicle computer 108 and/or a human operator. The human operator may control the steering system 114 via, e.g., a steering wheel.

The transceiver 136 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 136 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. In particular, the remote server can be the computer 102 of the calibration environment 122. The transceiver 136 may be one device or may include a separate transmitter and receiver.

The user interface 138 presents information to and receives information from an occupant of the vehicle 100. The user interface 138 may be located, e.g., on an instrument panel in a passenger cabin of the vehicle 100, or wherever may be readily seen by the occupant. The user interface 138 may include dials, digital readouts, screens, speakers, and so on for providing information to the occupant, e.g., human-machine interface (HMI) elements such as are known. The user interface 138 may include buttons, knobs, keypads, microphone, and so on for receiving information from the occupant.

The calibration described herein determines at least one calibration value for an adjustment model. For the purposes of this disclosure, an "adjustment model" is a transformation of optical data into different optical data based on other data. The adjustment model is a model of motion of the vehicle sensor 104 relative to the vehicle 100 resulting from motion of the vehicle 100. The adjustment model can correct for distortion and/or misalignment of the vehicle sensors 104. Adjusting the optical data using the adjustment model can be based on the motion data from the motion sensors 134.

For example, the adjustment model can include at least one equation. For example, the adjustment model can be a physics-based model such as a spring model. The spring model can use spring elements to represent the connections between the body 116 and a road on which the vehicle 100 is traveling, the mounting of the vehicle sensor 104 to the body 116, and the mounting of the motion sensors 134 to the body 116. The spring elements may each be in series with damper elements. The arrangement of the spring model supplies a series of equations. Another example of a physics-based model including equations can be a finite-element analysis.

The adjustment model, e.g., the spring model or finite-element analysis, can use geometry of the attachment of the vehicle sensors 104, boundary conditions, and/or the motion data. For example, the adjustment model can track motion of the vehicle sensors 104 in one or more degrees of freedom, e.g., six degrees of freedom or three rotational degrees of freedom. Using three rotational degrees of freedom without linear degrees of freedom can be computationally less intensive that using six degrees of freedom while still capturing the relevant effects.

For another example, the adjustment model can include a machine-learning algorithm. The machine-learning algorithm can be any suitable algorithm for determining an adjustment to the sensor data, e.g., a neural network such as a recurrent neural network. The machine-learning algorithm can be trained using a dataset of inputs gathered while operating a vehicle of a same type as the vehicle 100, with a vehicle sensor of a same type mounted in a same manner as the vehicle sensor 104. The actual misalignment of the vehicle sensor can be recorded to serve as a ground truth for the training. Inputs to the machine-learning algorithm can include a motion state of the vehicle 100, a projected motion of the vehicle 100, an upcoming profile of a road on which the vehicle 100 is traveling, weather conditions, etc.

Furthermore, discrete time steps of the adjustment model may further be interpolated or extrapolated to the corresponding time frame of the optical data from the vehicle sensors 104, e.g., time steps for global-shutter effect, rolling-shutter frame-by-frame exposure time, update times for event-based cameras, timeframes for beam steering for a LIDAR, etc.

The computer 102 can be programmed to operate the vehicle 100 based on the adjustment model. For example, the computer 102 can be programmed to adjust the data from the vehicle sensor 104 by using the adjustment model, and operate the vehicle 100 based on the adjusted data, e.g., by instructing the propulsion 110, the brake system 112, and the steering system 114 using known autonomous-operation algorithms with the adjusted data as inputs.

The adjustment model includes at least one calibration value, e.g., a plurality of calibration values. For example, if the adjustment model includes equations, the calibration values can include at least one coefficient for the equations, e.g., spring constants for the spring elements of the spring model. For another example, if the adjustment model is a machine-learning algorithm, the calibration values can include at least one weight of the machine-learning algorithm. More specifically, the machine-learning algorithm can be a neural network including a plurality of layers including a terminal layer, i.e., a layer that is farthest from the inputs and that provides the outputs, and the terminal layer can include the weights that are calibration values. Thus, the neural network can be trained before the calibration, and the calibration can modify the terminal layer of the neural network, in essence "fine-tuning" the neural network.

The vehicle computer 108 can be programmed to output a message, e.g., via the user interface 138, requesting to determine the at least one calibration value for the adjustment model in response to a criterion being satisfied. The criterion can be chosen to correlate to a length of operation of the vehicle 100 over which the calibration values may have drifted. For example, the criterion can be that a mileage since a last calibration exceeds a distance threshold, that a time since the last calibration exceeds a time threshold, etc.

Returning to FIG. 1, a technician can provide the vehicle 100 in the calibration environment 122 to perform the calibration of one of the vehicle sensors 104, referred to hereinafter as the vehicle sensor 104 or the vehicle sensor 104 of interest. The techniques described herein can be performed independently for each of the vehicle sensors 104. Providing the vehicle 100 to calibrate the vehicle sensor 104 can be prompted by the criterion being satisfied as just described. Alternatively or additionally, providing the vehicle 100 to calibrate the vehicle sensor 104 can be performed upon completion of manufacturing the vehicle 100, e.g., shortly after the vehicle 100 has left an assembly line. The calibration of the vehicle sensor 104 can include a static calibration and a dynamic calibration, as will be described in turn.

The computer 102 or vehicle computer 108 can perform a static calibration of the vehicle sensor 104 based on data from the vehicle sensor 104 measured while vibrations are not being applied to the vehicle 100 by the dynamic exciter 124, i.e., while the vehicle 100 is stationary and undisturbed. For example, the static calibration can be performed before the vibrations are applied for the dynamic calibration, as will be described below. The vehicle 100 may be placed on the dynamic exciter 124 while the dynamic exciter 124 is inactive. Alternatively, the static calibration can be performed before placing the vehicle 100 on the dynamic exciter 124.

The static calibration can include determining intrinsic and/or extrinsic parameters of the vehicle sensor 104. For example, if the vehicle sensor 104 is a camera, the intrinsic parameters can include focal length, image sensor format, and principal point, and the extrinsic parameters can include a translation matrix and a rotation matrix that transform between an origin of a coordinate system of the vehicle 100 and a neutral position of the camera. The neutral position of the vehicle sensor 104 is the position of the vehicle sensor 104 when undisturbed. The static calibration can be performed using data from the vehicle sensor 104 with the calibration target 130 in the field of view. The computer 102 or the vehicle computer 108 can be programmed to perform the static calibration using any suitable algorithm, e.g., Zhang's method, Tsai's algorithm, Selby's method, etc. For another example, the static calibration can include determining chromatic aberration, vignetting, distortion model parameters, etc. The intrinsic and/or extrinsic parameters determined by the static calibration can be stored in the memory of the vehicle computer 108.

The dynamic calibration can be performed using data produced by the vehicle sensor 104 of interest and the calibration sensors 106 while vibrations are applied to the vehicle 100. The vibrations can cause the vehicle sensor 104 to deviate from the neutral position. By determining the at least one calibration value for the adjustment model based on data measured while the vibrations move the vehicle sensor 104 away from the neutral position, the dynamic calibration can permit the vehicle computer 108 to use the adjustment model to accurately adjust the data from the vehicle sensor 104 while the vehicle 100 is in operation, e.g., to compensate for road vibrations.

The computer 102 can be programmed to instruct the dynamic exciter 124 to apply the vibrations to the vehicle 100, e.g., by actuating the actuators 126. Applying the vibrations can include instructing the dynamic exciter 124 to apply the vibrations independently to each wheel 128 of the vehicle 100, e.g., by providing different instructions to the respective actuators 126. Alternatively, the vibrations can be applied by operating the vehicle 100 to travel along a route having a known vibration profile.

The calibration targets 130 can be fixed in place within the calibration environment 122 while the vibrations are applied to the vehicle 100. Alternatively or additionally, the calibration targets 130 can be moved or rotated, e.g., by a robotic arm, according to a preset pattern, e.g., to appear in fields of view of multiple vehicle sensors 104. Applying the vibrations can also include instructing one or more components of the vehicle 100 to actuate, for components that produce vibrations such as the propulsion 110.

The vibrations can follow a preset sequence. The preset sequence can be stored in the memory of the computer 102, and the computer 102 can be programmed to instruct the dynamic exciter 124 to apply the vibrations according to the preset sequence. For example, the preset sequence can include a repeating pattern, e.g., can follow a repeating mathematical function such as a sine wave. For another example, the preset sequence can include a previously measured sequence of road vibrations. The previously measured sequence of road vibrations can be recorded during a trip by, e.g., a vehicle of a same model as the vehicle 100. The computer 102 can store a plurality of previously measured sequences of road vibrations, e.g., from different types of roads such as paved, paved with potholes, gravel, cobblestone, etc. For another example, the preset sequence can be randomly generated, e.g., to fit a particular power spectral density. The power spectral density can be chosen to encompass a range of vibration frequencies that the vehicle 100 is likely to encounter in operation. For another example, the preset sequence can include a plurality of the preset sequences just described applied in series, e.g., multiple sine waves of different frequencies, multiple previously measured sequences of road vibrations of different types of roads, etc. For another example, the preset sequence can be applied with a known surface roughness of a roller of a chassis dynamometer, with the surface roughness changing circumferentially around the roller. For another example, the preset sequence can be a known vibration profile of a route along which the vehicle 100 is traveling.

The dynamic calibration can include, while applying the vibrations to the vehicle 100, measuring a first time series of positions of the vehicle sensor 104 by at least one of the calibration sensors 106. The first time series can include a sequence of three-dimensional positions of the vehicle sensor 104 of interest paired with respective times. The first time series can further include a sequence of orientations of the vehicle sensor 104 based on the location of the beam emitted by the vehicle sensor 104, paired with respective times. The computer 102 can be programmed to receive the first time series from the calibration sensors 106. The computer 102 can also receive calibration parameters such as distortion parameters from the static calibration, which the computer 102 can use when receiving data from the vehicle sensors 104 below.

The vehicle sensor 104 can measure data, e.g., of a field of view including one or more of the calibration targets 130, while the vibrations are applied to the vehicle 100 by the dynamic exciter 124. The computer 102 or the vehicle computer 108 can be programmed to determine a second time series of motion of the vehicle sensor 104 based on data from the vehicle sensor 104. Determining the second time series can be based on positions of the calibration target 130 in the data from the vehicle sensor 104. For example, the computer 102 or vehicle computer 108 can determine the movement of the vehicle sensor 104 based on a known position of the calibration target 130 in the calibration environment 122, the neutral position of the vehicle sensor 104 known from the static calibration, and the changing pixel coordinates of a point on the calibration target 130 in the data from the vehicle sensor 104 according to known transformations. For another example, the computer 102 or vehicle computer 108 can determine the movement of the vehicle sensor 104 using a machine-learning algorithm, e.g., a convolutional neural network, with the pixel coordinates of the point on the calibration target 130.

The computer 102 can be programmed to receive the second time series. For example, the computer 102 can be programmed to receive the data from the vehicle sensor 104 and determine the second time series from the data as just described, or the computer 102 can be programmed to receive the second time series from the vehicle computer 108 after the vehicle computer 108 determines the second time series as just described. The compute 102 can receive the data from the vehicle sensor 104 or the second time series from the vehicle computer 108 via the transceiver 136 of the vehicle 100 or via a wired connection to the communications network 132 of the vehicle 100.

The computer 102 can be programmed to fuse the first and second time series. Fusion is combining data from disparate sources together so that the resulting data has less uncertainty than if the data from each source were used individually, e.g., in creating a unified model of the position of the vehicle sensor 104 in the calibration environment 122. The sensor fusion can be performed with one or more algorithms, e.g., Kalman filter, central limit theorem, Bayesian networks, Dempster-Shafer, machine-learning algorithms such as convolutional neural networks, etc. The fusion of the first and second time series can result in a third time series of positions of the vehicle sensor 104 over time.

The computer 102 can be programmed to determine the at least one calibration value, e.g., a plurality of the calibration values, for the adjustment model based on the fusion of the first and second time series. For example, if the adjustment model is a system of equations and the calibration values are coefficients in the equations, the computer 102 can input the preset sequence of vibrations and the third time series of positions into the equations, leaving the coefficients as the only remaining unknowns. The computer 102 can then solve the equations for the coefficients.

For another example, if the adjustment model is a machine-learning algorithm and the calibration values are weights in the machine-learning algorithm, the computer 102 can train the machine-learning algorithm using the preset sequence of vibrations as an input and the third time series of positions as ground truth. The computer 102 can hold the machine-learning algorithm unchanged except for the calibration values serving as weights.

The computer 102 can be programmed to output the calibration values. The computer 102 can output the adjustment model with the calibration values included or can output the calibration values in isolation. For example, the computer 102 can be programmed to load the calibration values onto the vehicle computer 108, e.g., via the transceiver 136 of the vehicle 100 or a wired connection to the communications network 132 of the vehicle 100. For another example, the technician can load the calibration values onto the vehicle computer 108 after receiving the calibration values from the computer 102. The vehicle computer 108 is then ready to operate the vehicle 100 based on data from the vehicle sensor 104 adjusted by the adjustment model, as described above.

Figure 3:
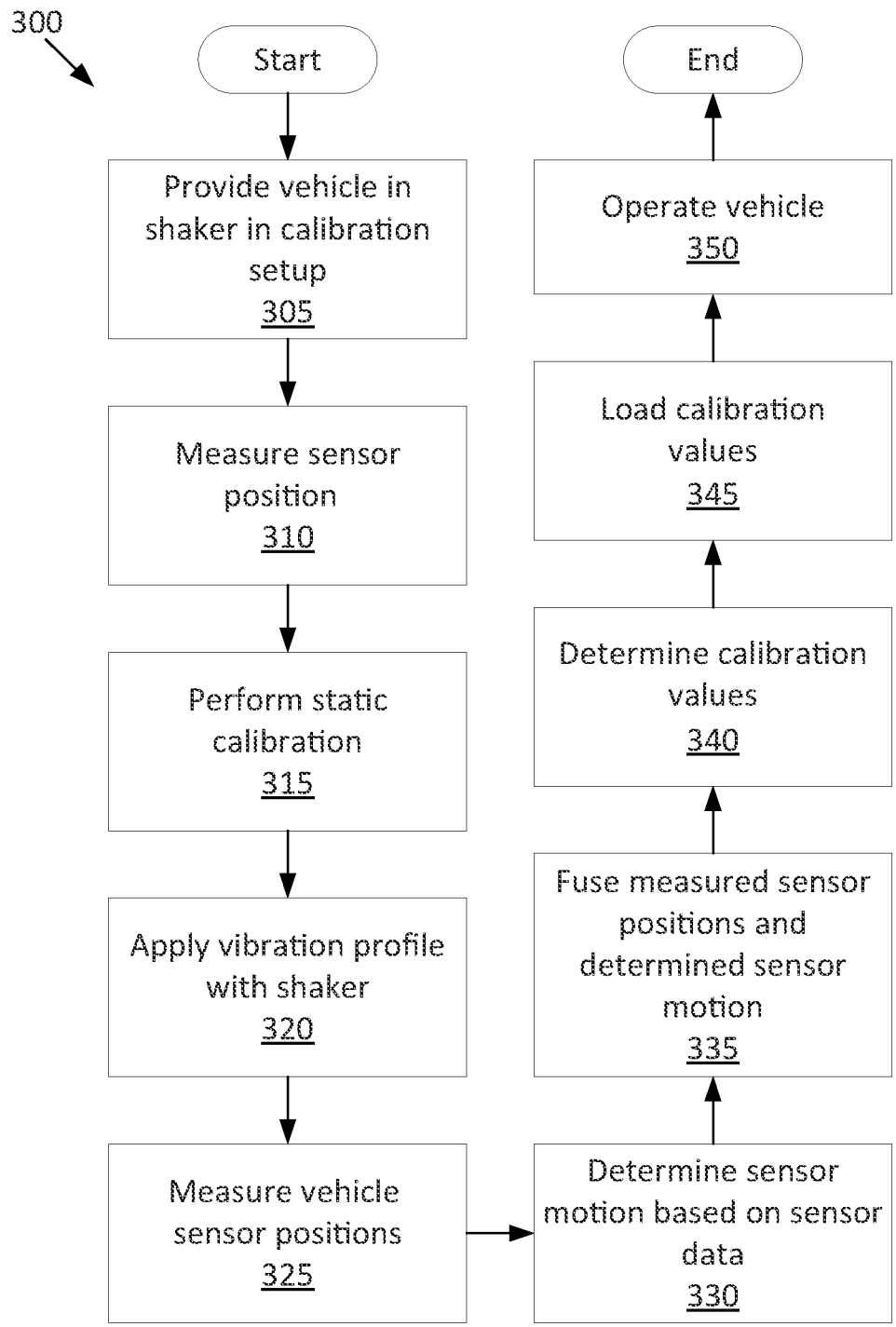
FIG. 3 is a process flow diagram of an example process for calibrating vehicle sensors of the vehicle.

FIG. 3 is a process flow diagram illustrating an exemplary process 300 for calibrating the vehicle sensor 104. As a general overview of the process 300, the process 300 begins with a technician providing the vehicle 100 in the calibration environment 122. The calibration sensors 106 measure the position of the vehicle sensor 104 in the neutral position. The computer 102 or the vehicle computer 108 performs a static calibration of the vehicle sensor 104. The dynamic exciter 124 applies vibrations to the vehicle 100, and the vehicle sensor 104 and calibration sensors 106 measure data while the vibrations are being applied. The computer 102 or the vehicle computer 108 determines the motion of the vehicle sensor 104. The computer 102 fuses the first and second time series and determines the calibration values. The computer 102 or the technician loads the calibration values onto the vehicle computer 108. Finally, the vehicle 100 is operated with data from the vehicle sensor 104 adjusted by the adjustment model.

The process 300 begins in a block 305, in which the technician provides the vehicle 100 in the calibration environment 122, specifically on the dynamic exciter 124, as described above. The technician can provide the calibration target 130 in a field of view of the vehicle sensor 104.

Next, in a block 310, the calibration sensors 106 measure the neutral position of the vehicle sensor 104, as described above.

Next, in a block 315, the computer 102 or the vehicle computer 108 performs the static calibration of the vehicle sensor 104 based on the data from vehicle sensor 104 while the vibrations are not being applied to the vehicle 100 and based on the neutral position of the vehicle sensor 104, as described above.

Next, in a block 320, the computer 102 or the technician instructs the dynamic exciter 124 to apply the vibrations to the vehicle 100 or operates the vehicle 100 along a route with a known vibration profile, as described above. The calibration target 130 is fixed while the vibrations are applied to the vehicle 100.

Next, in a block 325, while the vibrations are being applied, the calibration sensors 106 measure the first time series of positions of the vehicle sensor 104, and the vehicle sensor 104 can measure data of a field of view including the calibration target 130. The vibrations can cease after measurement by the calibration sensors 106 and vehicle sensor 104.

Next, in a block 330, the computer 102 receives the first and second time series, as described above. The computer 102 receives the first time series from the calibration sensors 106. The vehicle computer 108 can determine the second time series from the data from the vehicle sensor 104, and the computer 102 can receive the second time series from the vehicle computer 108, as described above. Alternatively, the computer 102 can receive the data from the vehicle sensor 104 and determine the second time series from the data, as described above.

Next, in a block 335, the computer 102 fuses the first and second time series, as described above.

Next, in a block 340, the computer 102 determines the calibration values for the adjustment model based on the fusion of the first and second time series, as described above.

Next, in a block 345, the computer 102 outputs the calibration values, and the computer 102 or the technician loads the calibration values onto the vehicle computer 108, as described above.

Next, in a block 350, the vehicle computer 108 operates the vehicle 100 based on data from the vehicle sensor 104 adjusted by the adjustment model, as described above. After the block 350, the process 300 ends.

Figure 4:
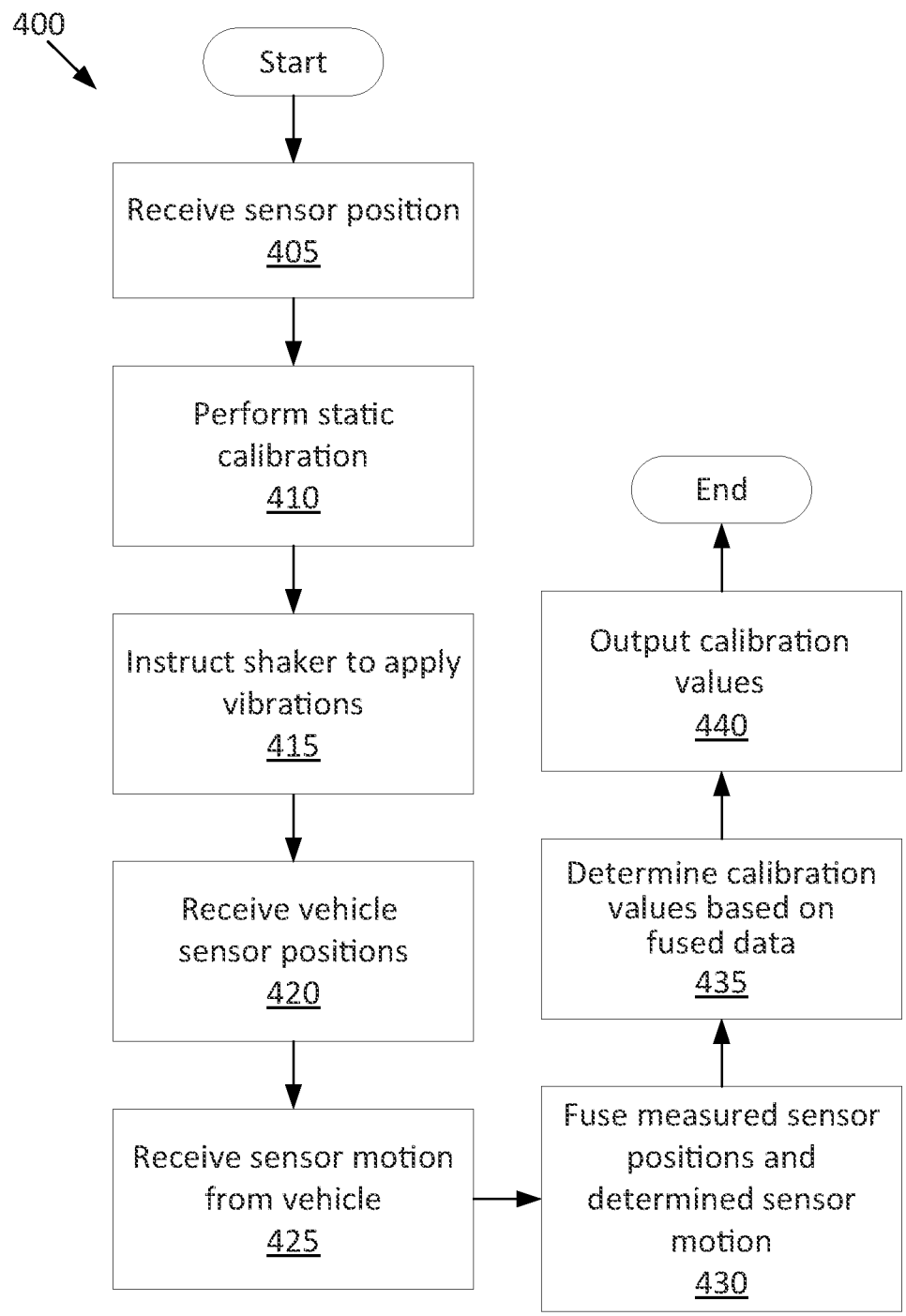
FIG. 4 is a process flow diagram of an example process for a computer of the calibration setup to calibrate the vehicle sensors.

FIG. 4 is a process flow diagram illustrating an exemplary process 400 for calibrating the vehicle sensor 104 by the computer 102. The memory of the computer 102 stores executable instructions for performing the steps of the process 400 and/or programming can be implemented in structures such as mentioned above. The process 400 lays out an example of the steps performed by the computer 102 within the process 300 just described. As a general overview of the process 400, the computer 102 receives the position of the vehicle sensor 104, performs the static calibration of the vehicle sensor 104, instructs the dynamic exciter 124 to apply the vibrations to the vehicle 100, receives the first time series of positions of the vehicle sensor 104 from the calibration sensors 106, receives the second time series of motion of the vehicle sensor 104, fuses the first and second time series, determines the calibration values, and outputs the calibration values.

The process 400 begins in a block 405, in which the computer 102 receives the neutral position of the vehicle sensor 104 from the calibration sensors 106.

Next, in a block 410, the computer 102 performs the static calibration of the vehicle sensor 104 based on the data from vehicle sensor 104 while the vibrations are not being applied to the vehicle 100 and based on the neutral position of the vehicle sensor 104, as described above.

Next, in a block 415, the computer 102 instructs the dynamic exciter 124 to apply the vibrations to the vehicle 100, as described above.

Next, in a block 420, the computer 102 receives the first time series of positions of the vehicle sensor 104 from the calibration sensors 106, measured while the vibrations are applied to the vehicle 100, as described above.

Next, in a block 425, the computer 102 receives the second time series of motion of the vehicle sensor 104 measured while the vibrations are applied to the vehicle 100, as described above.

Next, in a block 430, the computer 102 fuses the first and second time series, as described above.

Next, in a block 435, the computer 102 determines the calibration values for the adjustment model based on the fusion of the first and second time series, as described above.

Next, in a block 440, the computer 102 outputs the calibration values, as described above.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
receive a first time series of positions of a vehicle sensor mounted on a vehicle from at least one calibration sensor spaced from the vehicle, measured while vibrations are applied to the vehicle;
receive a second time series of motion of the vehicle sensor based on data from the vehicle sensor measured while the vibrations are applied to the vehicle;
fuse the first and second time series; and
determine at least one calibration value for an adjustment model based on the fusion of the first and second time series, the adjustment model being a model of motion of the vehicle sensor relative to the vehicle resulting from motion of the vehicle.

2. The computer of claim 1, wherein the first time series includes an orientation of the vehicle sensor based on a location of a beam emitted by the vehicle sensor.

3. The computer of claim 1, wherein the instructions further include instructions to instruct a dynamic exciter to apply the vibrations to the vehicle.

4. The computer of claim 3, wherein the vibrations follow a preset sequence.

5. The computer of claim 4, wherein the preset sequence includes a repeating pattern.

6. The computer of claim 4, wherein the preset sequence includes a previously measured sequence of road vibrations.

7. The computer of claim 1, wherein the instructions further include instructions to output the at least one calibration value.

8. The computer of claim 1, wherein the instructions further include instructions to perform a static calibration of the vehicle sensor based on data from the vehicle sensor measured while the vibrations are not being applied to the vehicle.

9. The computer of claim 1, wherein fusing the first and second time series includes executing a machine-learning algorithm.

10. The computer of claim 1, wherein the adjustment model includes at least one equation, and the at least one calibration value includes at least one coefficient for the at least one equation.

11. The computer of claim 1, wherein the adjustment model includes a machine-learning algorithm, and the at least one calibration value includes at least one weight of the machine-learning algorithm.

12. The computer of claim 11, wherein the machine-learning algorithm is a neural network including a plurality of layers including a terminal layer, and the terminal layer includes the at least one weight.

13. A method comprising:
applying vibrations to a vehicle;
while applying the vibrations to the vehicle, measuring a first time series of positions of a vehicle sensor mounted on the vehicle by at least one calibration sensor spaced from the vehicle;
determining a second time series of motion of the vehicle sensor based on data from the vehicle sensor measured while applying vibrations to the vehicle;
fusing the first and second time series;
determining at least one calibration value for an adjustment model based on the fusion of the first and second time series, the adjustment model being a model of motion of the vehicle sensor relative to the vehicle resulting from motion of the vehicle; and
loading the adjustment model onto a vehicle computer of the vehicle.

14. The method of claim 13, further comprising providing the vehicle on a dynamic exciter, wherein applying the vibrations includes instructing the dynamic exciter to apply the vibrations.

15. The method of claim 14, wherein applying the vibrations includes instructing the dynamic exciter to apply the vibrations independently to each wheel of the vehicle.

16. The method of claim 13, further comprising providing a calibration target in a field of view of the vehicle sensor, wherein determining the second time series is based on positions of the calibration target in the data from the vehicle sensor.

17. The method of claim 16, wherein the calibration target is fixed while the vibrations are applied to the vehicle.

18. The method of claim 13, wherein the vehicle sensor is one of a camera, a radar, or a LIDAR.

19. The method of claim 13, further comprising operating the vehicle based on data from the vehicle sensor adjusted by the adjustment model.

20. The method of claim 13, wherein the vehicle computer is programmed to output a message requesting to determine the at least one calibration value for the adjustment model in response to a criterion being satisfied.

* * * * *